(12) United States Patent
Duursma et al.

(10) Patent No.: US 8,131,817 B2
(45) Date of Patent: *Mar. 6, 2012

(54) METHOD AND SYSTEM FOR GENERATING A GRAPHICAL DISPLAY FOR A REMOTE TERMINAL SESSION

(75) Inventors: Martin Duursma, West Pennant Hills (AU); Lee Laborczfalvi, Seven Hills (AU); Anatoliy Panasyuk, Pennant Hills (AU); David Robinson, Carlingford (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 106 days.

This patent is subject to a terminal disclaimer.

(21) Appl. No.: 12/108,016

(22) Filed: Apr. 23, 2008

(65) Prior Publication Data
US 2008/0201405 A1     Aug. 21, 2008

Related U.S. Application Data

(63) Continuation of application No. 10/098,157, filed on Mar. 14, 2002, now Pat. No. 7,376,695.

(51) Int. Cl.
G06F 15/16     (2006.01)
G06F 17/00     (2006.01)
G06F 3/00      (2006.01)

(52) U.S. Cl. ........ 709/217; 709/203; 709/246; 715/273; 715/738

(58) Field of Classification Search .................. None
See application file for complete search history.

(56) References Cited

U.S. PATENT DOCUMENTS

| | | |
|---|---|---|
| 4,013,828 A | 3/1977 | Judice |
| 4,410,916 A | 10/1983 | Pratt et al. |
| 4,463,424 A | 7/1984 | Mattson et al. |
| 4,499,499 A | 2/1985 | Brickman et al. |
| 4,562,423 A | 12/1985 | Humblet |
| 4,701,745 A | 10/1987 | Waterworth |
| 4,796,003 A | 1/1989 | Bentley et al. |
| 4,807,029 A | 2/1989 | Tanaka |
| 4,860,247 A | 8/1989 | Uchida et al. |

(Continued)

FOREIGN PATENT DOCUMENTS

EP     0 283 735     9/1988

(Continued)

OTHER PUBLICATIONS

Bar-Ness, "Word Based Data Compression Schemes", IEEE International Symposium on Circuies and Systems, 1989, vol. 1, p. 300-303.

(Continued)

*Primary Examiner* — Minh-Chau Nguyen
(74) *Attorney, Agent, or Firm* — Foley & Lardner LLP; John D. Lanza

(57) ABSTRACT

In one aspect the invention relates to a method for generating a graphical display for a remote terminal session. The method includes monitoring output produced by an application program executing on a server, identifying a bitmap representation within the output produced by the application program and determining a check value for the bitmap representation. The method also includes retrieving a compressed data format of the bitmap representation based at least in part on the check value and transmitting to the remote terminal session the compressed data format in place of the bitmap representation.

22 Claims, 2 Drawing Sheets

U.S. PATENT DOCUMENTS

| | | | |
|---|---|---|---|
| 4,862,392 A | 8/1989 | Steiner | |
| 4,870,662 A | 9/1989 | Lindbergh et al. | |
| 4,899,149 A | 2/1990 | Kahan | |
| 4,903,218 A | 2/1990 | Longo et al. | |
| 4,928,247 A | 5/1990 | Doyle et al. | |
| 4,937,036 A | 6/1990 | Beard et al. | |
| 4,949,281 A | 8/1990 | Hillenbrand et al. | |
| 4,958,303 A | 9/1990 | Assarpour et al. | |
| 4,992,954 A | 2/1991 | Takeda et al. | |
| 5,001,478 A | 3/1991 | Nagy | |
| 5,016,009 A | 5/1991 | Whiting et al. | |
| 5,049,881 A | 9/1991 | Gibson et al. | |
| 5,051,745 A | 9/1991 | Katz | |
| 5,072,412 A | 12/1991 | Henderson et al. | |
| 5,103,303 A | 4/1992 | Shoji et al. | |
| 5,115,479 A | 5/1992 | Murayama | |
| 5,119,319 A | 6/1992 | Tanenbaum | |
| 5,126,739 A | 6/1992 | Whiting et al. | |
| 5,155,485 A | 10/1992 | Sako et al. | |
| 5,161,015 A | 11/1992 | Citta et al. | |
| 5,164,727 A | 11/1992 | Zakhor et al. | |
| 5,231,697 A | 7/1993 | Yamada | |
| 5,241,625 A | 8/1993 | Epard et al. | |
| 5,309,555 A | 5/1994 | Akins et al. | |
| 5,315,698 A | 5/1994 | Case et al. | |
| 5,321,806 A | 6/1994 | Meinerth et al. | |
| 5,351,129 A | 9/1994 | Lai | |
| 5,384,568 A | 1/1995 | Grinberg et al. | |
| 5,406,279 A | 4/1995 | Anderson et al. | |
| 5,414,457 A | 5/1995 | Kadowaki et al. | |
| 5,455,576 A | 10/1995 | Clark et al. | |
| 5,469,540 A | 11/1995 | Powers et al. | |
| 5,473,742 A | 12/1995 | Polyakov et al. | |
| 5,481,704 A * | 1/1996 | Pellicano | 707/5 |
| 5,485,460 A | 1/1996 | Schrier et al. | |
| 5,515,111 A | 5/1996 | Guedalia | |
| 5,515,508 A | 5/1996 | Pettus et al. | |
| 5,521,597 A | 5/1996 | Dimitri | |
| 5,526,349 A | 6/1996 | Diaz et al. | |
| 5,537,551 A | 7/1996 | Denenberg et al. | |
| 5,557,749 A | 9/1996 | Norris | |
| 5,566,288 A | 10/1996 | Koerhsen | |
| 5,572,206 A | 11/1996 | Miller et al. | |
| 5,577,188 A | 11/1996 | Zhu | |
| 5,579,469 A | 11/1996 | Pike | |
| 5,623,603 A | 4/1997 | Jiang et al. | |
| 5,652,909 A | 7/1997 | Kodosky | |
| 5,657,390 A | 8/1997 | Elgamal et al. | |
| 5,659,685 A | 8/1997 | Williams et al. | |
| 5,664,129 A * | 9/1997 | Futatsugi et al. | 715/763 |
| 5,740,171 A | 4/1998 | Mazzola et al. | |
| 5,742,778 A | 4/1998 | Hao et al. | |
| 5,757,925 A | 5/1998 | Faybishenko | |
| 5,767,849 A | 6/1998 | Borgendale et al. | |
| 5,771,034 A | 6/1998 | Gibson | |
| 5,784,070 A | 7/1998 | Furuhashi et al. | |
| 5,784,570 A | 7/1998 | Funkhouser | |
| 5,826,027 A | 10/1998 | Pedersen et al. | |
| 5,844,553 A | 12/1998 | Hao et al. | |
| 5,862,347 A | 1/1999 | Suzuki et al. | |
| 5,864,678 A | 1/1999 | Riddle | |
| 5,864,711 A | 1/1999 | Mairs et al. | |
| 5,874,960 A | 2/1999 | Mairs et al. | |
| 5,877,757 A | 3/1999 | Baldwin et al. | |
| 5,881,241 A | 3/1999 | Corbin | |
| 5,918,019 A | 6/1999 | Valencia | |
| 5,944,791 A | 8/1999 | Scherpbier | |
| 5,949,975 A | 9/1999 | Batty et al. | |
| 5,953,503 A | 9/1999 | Mitzenmacher et al. | |
| 5,956,490 A | 9/1999 | Buchholz et al. | |
| 5,961,588 A | 10/1999 | Cooper et al. | |
| 5,968,132 A | 10/1999 | Tokunaga et al. | |
| 5,983,190 A | 11/1999 | Trower et al. | |
| 5,996,022 A | 11/1999 | Krueger et al. | |
| 5,999,179 A | 12/1999 | Kekic et al. | |
| 5,999,950 A | 12/1999 | Krueger et al. | |
| 6,014,133 A | 1/2000 | Yamakado et al. | |
| 6,034,689 A | 3/2000 | White et al. | |
| 6,052,120 A | 4/2000 | Nahi et al. | |
| 6,057,857 A | 5/2000 | Bloomfield | |
| 6,061,714 A | 5/2000 | Housel et al. | |
| 6,081,623 A | 6/2000 | Bloomfield et al. | |
| 6,112,244 A | 8/2000 | Moore et al. | |
| 6,112,250 A | 8/2000 | Appelman | |
| 6,148,340 A | 11/2000 | Bittinger et al. | |
| 6,161,126 A | 12/2000 | Wies et al. | |
| 6,178,461 B1 | 1/2001 | Chan et al. | |
| 6,182,125 B1 | 1/2001 | Borella et al. | |
| 6,185,625 B1 | 2/2001 | Tso et al. | |
| 6,233,571 B1 * | 5/2001 | Egger et al. | 707/2 |
| 6,240,442 B1 | 5/2001 | Domenikos et al. | |
| 6,256,662 B1 | 7/2001 | Lo et al. | |
| 6,282,542 B1 | 8/2001 | Carneal et al. | |
| 6,308,222 B1 | 10/2001 | Krueger et al. | |
| 6,345,279 B1 | 2/2002 | Li et al. | |
| 6,353,839 B1 | 3/2002 | King et al. | |
| 6,392,648 B1 * | 5/2002 | Florenca | 345/427 |
| 6,427,149 B1 | 7/2002 | Rodriguez et al. | |
| 6,430,591 B1 | 8/2002 | Goddard | |
| 6,449,658 B1 | 9/2002 | Lafe et al. | |
| 6,473,609 B1 | 10/2002 | Schwartz et al. | |
| 6,507,867 B1 | 1/2003 | Holland et al. | |
| 6,522,268 B2 | 2/2003 | Belu | |
| 6,704,024 B2 | 3/2004 | Robotham et al. | |
| 6,911,979 B2 * | 6/2005 | Nakatani | 345/440.1 |
| 7,103,105 B2 | 9/2006 | Oh et al. | |
| 7,143,109 B2 | 11/2006 | Nagral et al. | |
| 7,376,695 B2 * | 5/2008 | Duursma et al. | 709/203 |
| 2002/0085036 A1 * | 7/2002 | Nakatani | 345/764 |
| 2002/0107988 A1 | 8/2002 | Jordan | |
| 2002/0162068 A1 | 10/2002 | Meggers | |
| 2003/0004933 A1 | 1/2003 | Ben-Yehezkel | |
| 2003/0120714 A1 * | 6/2003 | Wolff et al. | 709/200 |
| 2004/0049598 A1 * | 3/2004 | Tucker et al. | 709/246 |

FOREIGN PATENT DOCUMENTS

| | | |
|---|---|---|
| EP | 0 384 339 A2 | 8/1990 |
| EP | 0 483 576 B1 | 5/1992 |
| EP | 0 643 514 A2 | 3/1995 |
| EP | 0 648 038 A2 | 4/1995 |
| EP | 0 682 583 | 11/1995 |
| EP | 0 691 628 | 1/1996 |
| EP | 0 739 140 | 10/1996 |
| EP | 0 767 563 A2 | 4/1997 |
| EP | 0 836 145 | 4/1998 |
| EP | 0 841 615 A2 | 5/1998 |
| GB | 2 136 171 | 9/1984 |
| JP | 06-125363 | 5/1994 |
| JP | 06-332782 | 12/1994 |
| WO | WO-93/15457 A1 | 8/1993 |
| WO | WO-94/03853 | 2/1994 |
| WO | WO-94/14114 A1 | 6/1994 |
| WO | WO-95/20863 | 8/1995 |
| WO | WO-97/18635 | 5/1997 |
| WO | WO-97/28623 A3 | 8/1997 |
| WO | WO-98/52320 A2 | 11/1998 |
| WO | WO-01/92973 | 12/2001 |

OTHER PUBLICATIONS

Bursk et al. "A Brief Discussion of Switched Access to Frame Relay Services and Frame Relay Switched Virtual Circuits." Frame Relay Forum, Feb. 1996, pp. 1-7.

Citrix MetaFrame 1.8 Backgrounder, Apr. 1999, pp. 1-34.

Citron, "Creating a Wider Bus Using Caching Techniques", IEEE, 1995 pp. 90-99.

European Search Report for 10184329.0 dated Dec. 6, 2010.

European Search Report for 10184337.3 dated Dec. 28, 2010.

Freeman, H., "Computer Processing of Line-Drawing Images", ACM Computing Surveys, New York, NY, US, vol. 6, No. 1, pp. 57-97, Mar. 1974.

Hayashi, "A New Source Coding Method Based on LZW Adopting the Least Recently Used Deletion Heuristic", IEEE Pacific Rim Conference, 1993, vol. 1, p. 190-193.

IBM Technical Disclosure Bulletin, "Mechanisms for Finding Substitute Fonts in a Conference-Enabled X Windows Application", vol. 41, No. 1, Jan. 1998 pp. 137-142.

IBM Technical Disclosure Bulletin, "Remote Desktop Environments Reflected in Local Desktop Windows", vol. 36 No. 3, Mar. 1993, pp. 421-426.

International Search Report, PCT Application No. PCT/US03/07965, mailed on Jun. 2, 2003, 4 pages.

Johnson, "Software Guarantees Data Delivery: Starburst MFTP is the first shrink-wrapper package to multicast data reliably over multiprotocol nets." Data Communications, Apr. 1995, vol. 42, No. 5, p. 45.

Klett, Jr. "Cisco attacks crowding on multimedia nets", Computerworld, Mar. 6, 1995, vol. 29, No. 10, p. 10.

Koppen et al "A practical approach towards active hyperlinked documents", Computer Networks and ISDN Systems 30 (1998) pp. 251-258.

Mike Stock, "Technologies for Thin Client Architectures", Jan. 7, 2001, Department of Information Technology, University of Zurich, pp. 1-120.

Norton, the Norton Utilities, Version 5.0 Disk Explorer, Computing, Inc., 1990, 28-54.

Patents on Data Compression Algorithms, taken from http://www-iapr-ic.dimi.uniud.it/Udne/WebRes/ImageCoding/compress/patents-.html, Mar. 31, 1998, pp. 1-10.

Salomon, Springer-Verlag, "Data Compression", New York, 1998, p. 16-19.

Swallow, "Frame Relay PVC Multicast Service And Protocol Description", http://www.frforum.com, Oct. 1994, pp. 1-17.

Notice of Allowance regarding U.S. Appl. No. 10/507,469 dated Apr. 28, 2011.

Office Action regarding U.S. Appl. No. 10/507,469 dated Aug. 18, 2010.

Wallace, "ComNet '96: remote access server, Token Ring Switches among offerings", Computerworld, Feb. 5, 1996, vol. 30, No. 6, p. 14(1).

WebTV, "WebTV System Guide", http://developer.webtv.net/authoring/sysgde/sysgde.html, Sep. 13, 2000, pp. 1-12.

* cited by examiner

METHOD AND SYSTEM FOR GENERATING A GRAPHICAL DISPLAY FOR A REMOTE TERMINAL SESSION

BACKGROUND

1. Field of Invention

The invention generally relates to remote sessions, and, more particularly, to generating a graphical display for a remote terminal session.

2. Description of Prior Art

A thin-client protocol is used for displaying output, produced by an application running on a server, on a client with limited processing capabilities. Two exemplary thin client protocols are ICA, Independent Computing Architecture from Citrix Systems, Inc., Ft. Lauderdale, Fla. and RDP, Remote Desktop Protocol from Microsoft, Inc., Redmond, Wash. The client is also sometimes referred to as a remote terminal session. One thin-client protocol intercepts commands by the application program to the server operating system ("OS") to draw to a display screen. The intercepted or similar commands are transmitted to the remote session, using for example, the presentation layer packet. When the remote session (e.g., thin-client) receives the command, the remote session passes the received commands to the remote session OS. The thin-client draws the application program output on its display using the received commands as if the application program were executing on the thin-client.

Typically, when the application program draws images to the display screen, the image is represented as a bitmap. A bitmap format of an image is generally a very large data set. Thus the thin-client protocol must transmit over the network the bitmap representation of an image, which is a large amount of data, along with the applicable commands on how to display the bitmap representation. For networks of low bandwidth, this results in a large time delay before the complete image is received and displayed on the client. This can result in inconvenience and unhappiness for the user of the client. Also, if the user is paying directly for bandwidth used, for example in a wireless network, transmission of these large bitmap formats results in large costs associated with each transmission.

SUMMARY OF THE INVENTION

The invention lowers the time and cost of transmission of an image and other non-textual elements with a large bitmap representation by substituting an available compressed format of the image for the bitmap format. The compressed format can typically reduce the necessary bandwidth by a factor of 3 to 10. The client performs the decompression of received data using available libraries. The client then substitutes the decompressed image for the bitmap representation using, for example, modified thin-client protocol commands with other identifying data.

In one aspect the invention relates to a method for generating a graphical display for a remote terminal session. The method includes monitoring output produced by an application program executing on a server, identifying a bitmap representation within the output produced by the application program and determining a check value for the bitmap representation. The method also includes retrieving a compressed data format of the bitmap representation based at least in part on the check value and transmitting to the remote terminal session the compressed data format in place of the bitmap representation.

In one aspect the invention relates to a method for generating a graphical display for a remote terminal session. The method includes monitoring output produced by an application program executing on a server and identifying a textual element and a non-textual element of the output. The method also includes retrieving a compressed data format associated with the non-textual element and transmitting to the remote terminal session the textual element and the compressed data format in place of the non-textual element.

In one embodiment, the method further includes receiving the compressed data format and the textual element and generating a display using the textual element and the compressed data format. In another embodiment, the method further includes transmitting the compressed data format and the textual element using a presentation layer protocol packet. In another embodiment, the method further includes transmitting the presentation layer protocol packet using a command for transmitting a file in its native format.

In another embodiment, the method further includes conforming the presentation layer protocol packet to a remote access protocol, a thin-client protocol and/or a presentation protocol. In another embodiment, the method further includes transmitting further comprises replacing the bitmap representation with the compressed data format, wherein the non-textual element is a bitmap representation. In another embodiment, the method further includes determining whether the remote terminal session can render the non-textual element using the compressed data format. In another embodiment, the method further includes, upon determination that the remote terminal session cannot render the non-textual element using the compressed data format, transmitting an image-rendering library capable of rendering the non-textual element using the compressed data format.

In another embodiment, the method further includes intercepting the output and inspecting the intercepted output for a bitmap representation of the non-textual element. In another embodiment, the method further includes calculating a first check value for a bitmap representation of the non-textual element and searching an image store for the compressed data format with a second check value identical to the first check value.

In another aspect, the invention relates to a system for generating a graphical display for a remote terminal session. The system includes an output filter module and a server agent. In another embodiment, the system includes a client agent. In another embodiment, the system further includes a server node, wherein the server node including the server agent and the output filter module. In another embodiment, the system further includes a client node, wherein the client node includes the client agent and a display. In another embodiment, the system further includes a network.

In another aspect the invention relates to an article of manufacture having computer-readable program means embodied therein for generating a graphical display for a remote terminal session. The article includes computer-readable program means for performing any of the aforementioned methods.

BRIEF DESCRIPTION OF THE DRAWINGS

The above and further advantages of the invention may be better understood by referring to the following description taken in conjunction with the accompanying drawing, in which.

DETAILED DESCRIPTION

Figure 1:
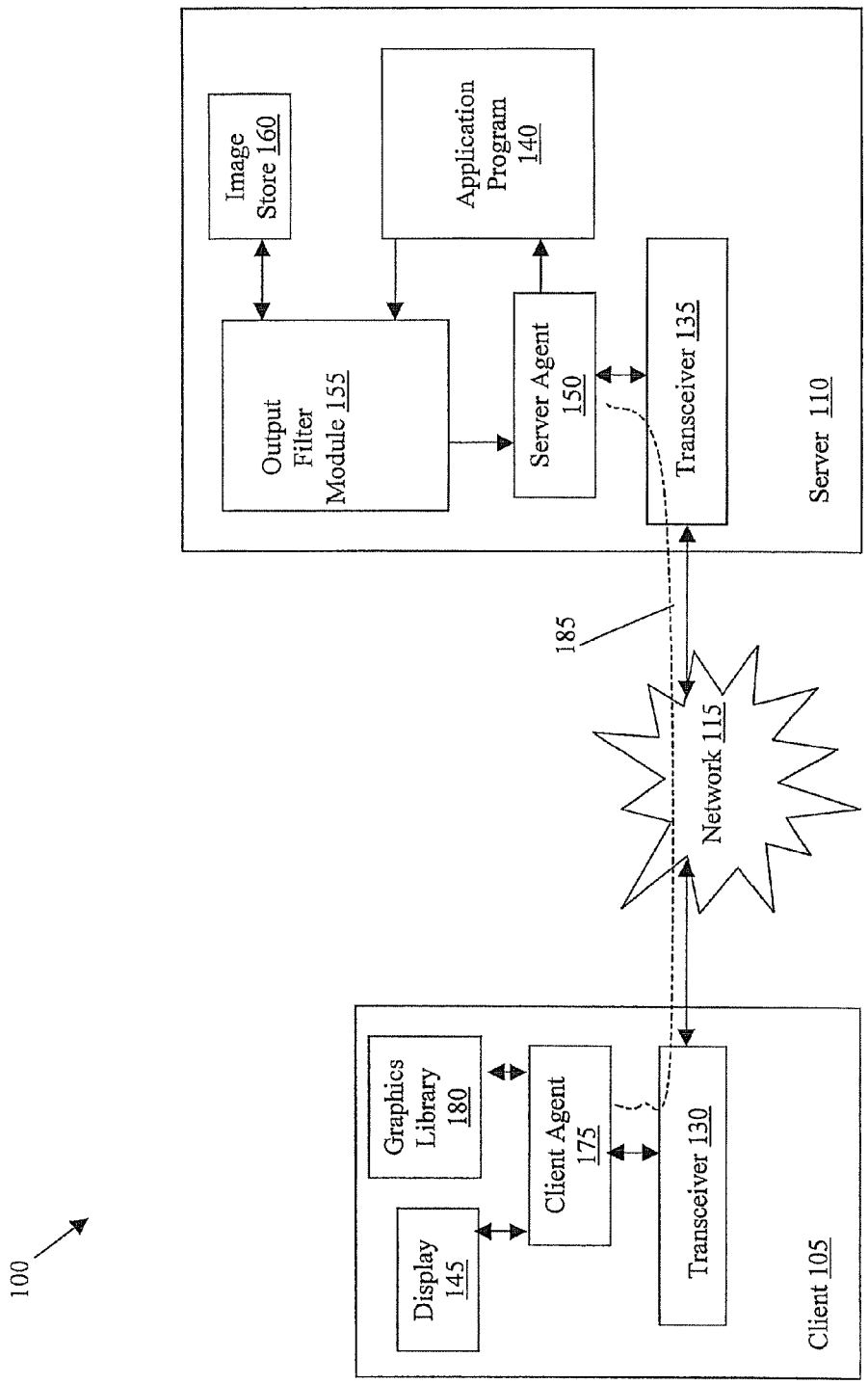
FIG. 1 is a block diagram of an illustrative embodiment of a system to generate a display for a remote terminal session in accordance with the invention.

In broad overview, FIG. 1 illustrates a system 100 to generate a display for a remote terminal session that includes a first computing system ("client node") 105 in communication with a second computing system ("server node") 110 over a network 115. For example, the network 115 can be a local-area network (LAN), such as a company Intranet, a wide area network (WAN) such as the Internet or the World Wide Web or the like. A user of the client node 105 can be connected to the network 115 through a variety of connections including standard telephone lines, LAN or WAN links (e.g., T1, T3, 56 kb, X.25), broadband connections (ISDN, Frame Relay, ATM), wireless connections and the like. The client node 105 includes a client transceiver 130 to establish communication with the network 115. The server node 110 includes a server transceiver 135 to establish communication with the network 115. The connections can be established using a variety of communication protocols (e.g., ICA, RDP, HTTP, TCP/IP, IPX, SPX, NetBIOS, Ethernet, RS232, direct asynchronous connections and the like).

The server node 110 can be any computing device capable of providing the requested services of the client node 105. Particularly, this includes generating and transmitting commands and data to the client node 105 that represents the output being produced by an application program 140 executing on the server 110. The server node 110 includes the server transceiver 135, the executing application program 140, a server agent 150, an output filter module 155 and an image store 160. The server agent 150 corresponds to a module that interfaces with a client agent 175 and other components of the server node 110 to support the remote display and operability of the application program 140. The server agent module 150 and all modules mentioned throughout the specification are implemented as a software program and/or a hardware device (e.g., ASIC, FPGA and the like)

For clarity, all of these components are shown on server node 110. It is to be understood that the server node 110 can represent a single server or can represent several servers in communication with each over the network 115 or another network (not shown). In multiple server embodiments, the functionality of the components can be distributed over the available servers. For example, in one embodiment with multiple servers, the transceiver 135 is on a web server, the application program 140, the server agent 150 and the output filter module 155 are on an application server and the image store 160 is on a storage device, such as a disk in a RAID system.

The client node 105 can be any computing device (e.g., a personal computer, set top box, wireless mobile phone, handheld device, personal digital assistant, kiosk, etc) used to provide a user interface to the application program 140 executing on the server node 110. The client node 105 includes the client transceiver 130, a display 145, a client agent 175 and a graphics library 180 (also referred to as an image-rendering library). The client agent 175 corresponds to a module, implemented as a software program and/or a hardware device (e.g., ASIC, FPGA and the like) that receives commands and data from the server node 110 and from a user (not shown) of the client node 105. The client agent 175 uses the received information when interacting with other components of the client node 105 (e.g., when directing the operating system to output data onto the display 145). The client agent 175 also transmits requests and data to the server node 110 in response to server-issued commands or user actions at the client node 105.

The server node 110 hosts one or more application programs 140 that can be accessed by the client nodes 105. Examples of such applications include word processing programs such as MICROSOFT Word and spreadsheet programs such as MICROSOFT Excel, both manufactured by Microsoft Corporation of Redmond, Wash. Other examples include financial reporting programs, customer registration programs, programs providing technical support information, customer database applications, application set managers and the like. For clarity, another example of an application program is Internet Explorer, manufactured by Microsoft Corporation of Redmond, Wash., and will be used as the exemplary application program 140. It is understood that other application programs can be used.

During execution of the application program 140, for example Internet Explorer, the server node 110 communicates with the client node 105 over a transport mechanism. In one embodiment, the transport mechanism provides multiple virtual channels 185 through the network 115 so the server agent 150 can communicate with the client agent 175. One of the virtual channels 185 provides a protocol for transmitting graphical screen data from the server node 110 to the client node 105. The server 110 executes a protocol driver, in one embodiment as part of the server agent 150, that intercepts graphical display interface commands generated by the application program 140 and targeted at the server's operating system. The protocol driver translates the commands into a protocol packet suitable for transmission over the transport mechanism.

The application program 140, in this example Internet Explorer, executing on the server 110, retrieves a web page. As explained above, the application program 140 generates graphical display commands to the server operating system, as if it was going to display the output at the server node 110. The server agent 150 intercepts these commands and transmits them to the client agent 175. The client agent 175 issues the same or similar commands to the client operating system to generate output for the display 145 of the client node 105.

In one embodiment, a web page has both textual elements (e.g., titles, text, ASCII characters and the like) and non-textual elements (e.g., images, photos, icons, splash screens and the like) incorporated therein. The non-textual elements are sometimes transmitted to the Internet Explorer application program 140 from a web server (not shown) in a compressed data format (e.g., file, data stream and the like), also referred to as the non-textual element's native format. Examples of compressed formats are JPEG, GIF, PNG and the like. The non-textual element represented in a compressed data format may be, for example, 20 kilobytes in size. That same non-textual element decompressed into a bitmap representation is, for example, 300 kilobytes in size.

The application program 140, when generating the display of the web page, retrieves, for example, a JPEG data format of a non-textual element and decompresses the JPEG data format into a bitmap for display. The output filter module 155 determines that the bitmap representation is from a compressed format and obtains the corresponding compressed format of the non-textual element from the image store 160, as explained in more detail below. In one embodiment, the image store 160 is persistent storage. In other embodiments, the image store 160 is temporary storage, cache, volatile memory and/or a combination of temporary and persistent storage.

The server agent 150 replaces the bitmap representation of the non-textual element with the non-textual element in the compressed data format that the output filter module 155 retrieved from the image store 160. The server agent 150 transmits the non-textual element in the compressed format, along with the graphical display interface commands associated with the bitmap representation, to the client node 105. In one embodiment the server agent 150 uses a unique protocol command that identifies a transmission of a non-textual element that is not in bitmap representation, even though the associated commands are applicable to a bitmap representation of a non-textual element. In other embodiments other identifying techniques can be used. For example, the protocol command can have a modifier comment, or a command switch. The command can also use a change of context, a combination of multiple commands and the like.

The client agent 175 receives the transmission of the non-textual element file in the compressed data format, along with the graphical display interface commands associated with the bitmap representation of the non-textual element. The client agent 175 determines that the non-textual element is in the compressed data format and not the bitmap representation. In one embodiment, the client agent 175 makes this determination because the non-textual element in compressed format is transmitted using a unique protocol command. In another embodiment, the size of the non-textual element data and/or other characteristics about the non-textual element included with the associated graphical display interface commands are enough to enable the client agent 175 to make the determination.

The client agent 175 determines whether the client node 105 contains the necessary library 180 to decompress the compressed format of the non-textual element. If the client node 105 has the appropriate graphics library(ies) 180 installed to perform the decompression algorithms, the client agent 175 uses the library 180 to decompress the compressed format of the non-textual element into its bitmap representation. The client agent 175 performs the received associated graphical display interface commands on the bitmap representation to generate the non-textual element of the output of the application program 140 on the client display 145.

In one embodiment, the client agent 175 does not contain all the decompressing algorithms to decompress the non-textual element from a compressed format into a bitmap representation. If the client node 105 does not have the appropriate graphics library(ies) 180 installed to perform the decompression algorithms, the client agent 175 requests the needed graphics library from the server node 110. In another embodiment, the client agent 175 determines if a predetermined set of the most widely used graphics libraries 180 are installed on the client node 105 prior to receiving any non-textual elements from the server node 110. If the most widely used graphics libraries 180 are not installed on the client node 105, the client agent 175 requests the missing libraries from the server node 110 prior to receiving any non-textual elements from the server node 110.

In yet another embodiment, the client agent 175 determines which graphics libraries 180 the client node 105 includes and transmits that library information to the server agent 150. In this embodiment, when the server agent 150 receives the compressed data format of a bitmap representation from the output filter module 155, the server agent 150 determines, using the transmitted library information, whether the client node 105 can render the compressed data format. If the server agent 150 determines that the client node 105 has the applicable library, the server agent 150 substitutes the compressed data format for the bitmap representation of the non-textual element. If the server agent 150 determines that the client node 105 does not have the applicable library, the server agent 150 does not substitute the compressed data format for the bitmap representation of the non-textual element and instead transmits the bitmap representation to the client 105.

For the server agent 150 to replace the bitmap representation of the non-textual element with the non-textual element in the compressed format, the output filter module 155 determines that the bitmap representation is from a compressed format contained in the image store 160. To make this determination, the output filter module 155 calculates one or more check values for the bitmap representation. For example, the output filter module 155 can calculate a single check value for the entire bitmap representation and/or the output filter module 155 can calculate four check values, one for each for the entire bitmap representation. In another example, the output filter module 155 can calculate N check values, one for each of the N lines in the bitmap representation. A check value is the result of an algorithm that generates a substantially unique value for different arrangements of data. The check value is, for example a Cyclic Redundancy Code ("CRC"), a check sum, a result of a hashing function and the like. The check value is based on the bitmap representation and not the data as arranged in a compressed data format. However, when the compressed data format is stored in the image store 160, it is stored with a check value attribute that corresponds to the one or more check values of the bitmap representation of the compressed data when decompressed.

The output filter module 155 searches the image store 160 for a non-textual element in compressed data format that has a check value attribute that is the same one or more check values the output filter module 155 calculates for the bitmap representation. The output filter module 155 retrieves the compressed format of non-textual element with the same check value attribute as the one or more check values and sends the compressed format of the non-textual element to the server agent 150 for transmittal to the client agent 175 in place of the bitmap representation.

The server node 110 stores compressed formats of non-textual elements in the image store 160 the first time the application program 140 calls a graphics library (not shown) to create a bitmap representation from a compressed format file. The output filter module 155 calculates the associated check value of the bitmap representation as the application program 140 decompresses the compressed format and generates the bitmap representation. As described above, the output filter module 155 can calculate the check value when the bitmap representation is complete, when a quadrant of the bitmap representation is complete, when a line of the bitmap representation is complete and the like. The server 110 stores the compressed format file and the associated check value attribute in the image store 160 and retrieves the compressed format file the first and any subsequent times the application program 140 generates the associated non-textual element.

Whether the server 110 stores the compressed format file and its associated check value attribute(s) in the image store 160 in a temporary portion (e.g., RAM memory buffer, cache and the like) or a persistent portion (e.g., disk, non-volatile memory buffer, and the like) is based at least in part on design and hardware limitations (e.g., the size of the persistent storage). One exemplary criterion used to make that determination is the number of times the application program 140 generates the non-textual element. For example, if the application program 140 generates a particular non-textual element more than a predetermined number of times, the server 110 stores the compressed format file and its associated check value attribute(s) corresponding to that particular non-textual element persistently in the image store 160.

In other embodiments, the server 110 stores the non-textual element if it is static, complex and the like. For example, if the application program 140 always generates a splash screen at initialization, the server 110 stores the compressed format file corresponding to that splash screen in the persistent portion of the image store 160. In another embodiment, if the non-textual element is complex, static and/or generated repeatedly but does not have a corresponding compressed format file, the output filter module 155 generates a compressed format file for that non-textual element, in a standards-based or proprietary-based format. In any subsequent transmissions, the server agent 150 transmits the generated compressed format file in place of the bitmap representation. If the compressed format is a proprietary-based format, the server agent 150 determines whether the client node 105 includes the applicable proprietary-based graphics library to decompress the compressed format file into a bitmap representation. If not included on the client node 105, the server agent 150 transmits the applicable library to the client node 105 for installation.

Although the illustrated embodiment depicts the image store 160 on the server node 110, in an alternate embodiment, at least a portion of the image store (not shown) is on the client node 105. In this alternate embodiment, the output filter module 155 calculates the one or more check values of the bitmap representation and transmits the one or more check values to the server agent 150. The server agent 150 transmits these one or more check values to the client agent 175. The client agent 175 searches the portion of the image store on the client node 105 for a compressed data format stored with an identical one or more check values attribute. The client agent 175 transmits the results of this search to the server agent 150.

If the compressed data format for the non-textual element exists on the client node 105, the server agent 150 does not have to send either the compressed data format or the bitmap representation over the network 115. The server agent 150 only transmits the graphical display interface commands associated with the bitmap representation of the non-textual element. If the compressed data format for the non-textual element does not exist on the client node 105, the output filter module 155 obtains the corresponding compressed format of the non-textual element from the image store 160. The server agent 150 replaces the bitmap representation of the non-textual element with the non-textual element in the compressed data format that the output filter module 155 retrieved from the image store 160. The server agent 150 transmits the non-textual element in the compressed format, along with the graphical display interface commands associated with the bitmap representation, to the client node 105.

Figure 2:
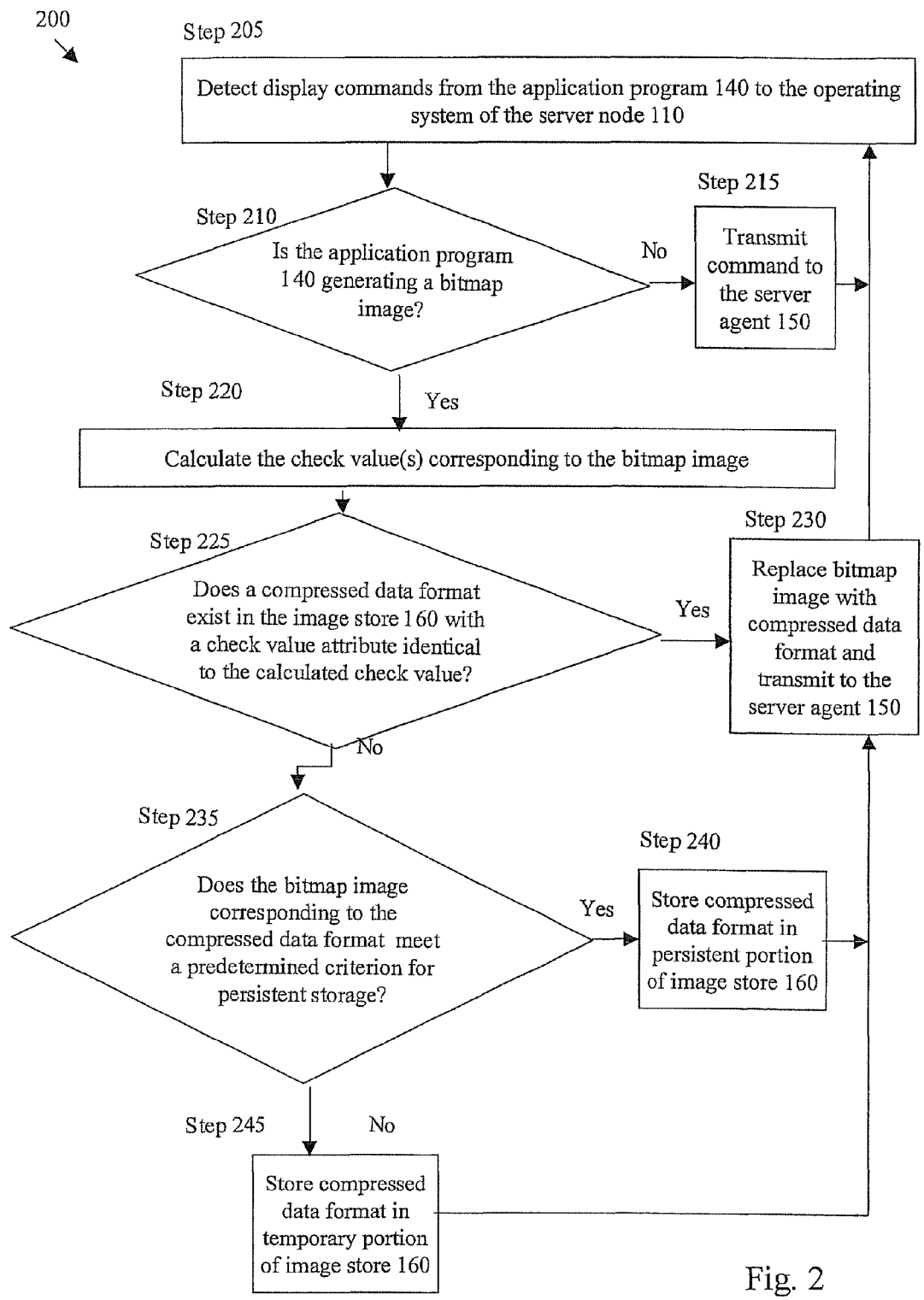
FIG. 2 is a flow diagram of an illustrative embodiment of a process to generate a display for a remote terminal session in accordance with the invention.

FIG. 2 illustrates an exemplary embodiment of a process 200 to generate a display for a remote terminal session, using the exemplary embodiment of FIG. 1. The output filter module 155 monitors the output of the application program 140 by monitoring calls made to the operating system of the server node 110. When the output filter module 155 detects (step 205) a display command from the application program 140, the output module 155 determines (step 210) whether the application program 140 is generating a bitmap representation of a non-textual element.

If the application program 140 is not generating a bitmap representation of a non-textual element, the output filter module 155 transmits (step 215) the display command to the server agent 150, which transmits that command, or a representative command defined in the protocol, to the client agent 175. If the application program 140 is generating a bitmap representation of a non-textual element, the output filter module 155 calculates (step 220) one or more check values corresponding to the bitmap representation of the non-textual image.

Using the one or more calculated check value(s), the output filter module 155 searches the image store 160 to determine (step 225) whether a compressed data format with identical check value attribute(s) exists. If there is a compressed data format in the image store 160 with check value attribute(s) identical to the one or more check values the output filter module 155 calculates, the output module 155 replaces (step 230) the bitmap representation of the non-textual element with the compressed data format. The output module 155 transmits (step 230) the compressed data format to the server agent 150 for eventual transmission to the client agent 175. The output module 155 also transmits all of the commands associated with the replaced bitmap representation along with the compressed data format.

If there is not a compressed data format with identical one or more check value attributes in the image store 160, the output module 155 determines (step 235) whether the bitmap representation of a non-textual element corresponding to the compressed data format meets a predetermined criterion for persistent storage (e.g., any of the criteria described above). If the output module 155 determines (step 235) that the predetermined criterion is met, the output module 155 stores (step 240) the compressed data format and the corresponding check value attribute, identical to the one or more calculated check values, in the persistent portion of the image store 160. If the output module 155 determines (step 235) that the predetermined criterion is not met, the output module 155 stores (step 245) the compressed data format and the corresponding check value attribute, identical to the one or more calculated check values, in the temporary portion of the image store 160.

Once the output module 155 stores (step 240 or 245) the compressed data format and the corresponding check value attribute, identical to the one or more calculated check values, in the image store 160, the output module 155 replaces (step 230) the bitmap representation of the non-textual element with the compressed data format. The output module 155 transmits (step 230) the compressed data format to the server agent 150 for eventual transmission to the client agent 175. The output module 155 continues monitoring the output generated by the application program 140 until the output module 155 detects (step 205) another display command from the application program 140.

EQUIVALENTS

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for generating a graphical display, the method comprising:

analyzing display output via an output filter executing on a first computing device, the display output comprising bitmap display data and textual data generated by an application executing on the first computing device, and displayed on a display device connected to a second computing device;

identifying, by the output filter, within the display output bitmap display data corresponding to a bitmap representation of a non-textual element;

calculating, by the output filter, a check value representative of the bitmap representation of the non-textual element;

determining, by the first computing device, whether the calculated check value matches a second check value on a repository of the second computing device, the second check value corresponding to the bitmap representation of the non-textual element; and if the calculated check value does not match the second check value, retrieving, by the output filter from a repository of the first computing device, a compressed format data element of the bitmap display data based on the calculated check value matching a first check value in the repository of the first computing device and transmitting, by the first computing device to the second computing device, the retrieved compressed format data element in place of the bitmap representation of the non-textual element, else, transmitting, by the first computing device to the second computing device, graphical display interface commands associated with the bitmap display data along with the textual data.

2. The method of claim 1, wherein identifying bitmap display data further comprises identifying one or more non-textual elements.

3. The method of claim 1, wherein identifying bitmap display data further comprises identifying one or more non-textual elements transmitted as display image data.

4. The method of claim 1, wherein calculating further comprises calculating a string representative of the bitmap display data.

5. The method of claim 1, wherein calculating further comprises calculating a plurality of check values representative of the bitmap display data.

6. The method of claim 1, further comprising searching the repository of the first computing device.

7. The method of claim 1, further comprising searching the repository of the second computing device.

8. The method of claim 1, further comprising transmitting to the second computing device the textual data along with the compressed format data element.

9. The method of claim 1, further comprising searching a repository installed on a third computing device.

10. The method of claim 1, further comprising searching a repository having a portion installed on a third computing device.

11. The method of claim 1, further comprising:
determining a rendering component does not exist on the second computing device in communication with the first computing device; and
transmitting the bitmap display data from the first computing device to the second computing device.

12. A system for generating a graphical display, the system comprising
an output filter executing on a first computing device to:
analyze display output comprising bitmap display data and textual data, the display output generated by an application executing on the first computing device, and displayed on a display device connected to a second computing device,
identify within the display output bitmap display data corresponding to a bitmap representation of a non-textual element,
calculate, by the output filter, a check value representative of the bitmap representation of the non-textual element,
wherein the first computing device determines whether the calculated check value matches a second check value on a repository of the second computing device, the second check value corresponding to the bitmap representation of the non-textual element, and
if the calculated check value does not match the second check value, the output filter retrieves from a repository of the first computing device a compressed format data element of the bitmap display data based on the calculated check value matching a first check value in the repository of the first computing device and the first computing device transmits to the second computing device the retrieved compressed format data element in place of the bitmap representation of the non-textual element,
else the first computing device transmits to the second computing device graphical display interface commands associated with the bitmap display data along with the textual data.

13. The system of claim 12, wherein the output filter identifies one or more non-textual elements.

14. The system of claim 12, wherein the output filter identifies one or more non-textual elements transmitted as display image data.

15. The system of claim 12, wherein the output filter calculates a string representative of the bitmap display data.

16. The system of claim 12, wherein the output filter calculates a check value representative of the bitmap display data.

17. The system of claim 12, wherein the output filter searches the repository of the first computing device.

18. The system of claim 12, wherein the output filter searches a repository of the second computing device.

19. The system of claim 12, wherein the first computing device transmits to the second computing device the textual data along with the compressed format data element.

20. The system of claim 12, wherein the output filter searches a repository installed on a third computing device.

21. The system of claim 12, wherein the output filter searches a repository having a portion installed on a third computing device.

22. The system of claim 12, wherein the output filter:
determines a rendering component does not exist on the second computing device in communication with the first computing device; and
transmits the bitmap display data from the first computing device to the second computing device.

* * * * *

UNITED STATES PATENT AND TRADEMARK OFFICE
CERTIFICATE OF CORRECTION

PATENT NO. : 8,131,817 B2  
APPLICATION NO. : 12/108016  
DATED : March 6, 2012  
INVENTOR(S) : Duursma et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 121 days.

Signed and Sealed this
Twenty-eighth Day of August, 2012

David J. Kappos
*Director of the United States Patent and Trademark Office*